US012519407B2

(12) United States Patent
Takahashi et al.

(10) Patent No.: US 12,519,407 B2
(45) Date of Patent: Jan. 6, 2026

(54) OPERATION CONTROL METHOD FOR ENGINE-DRIVEN ELECTRIC GENERATOR AND ENGINE-DRIVEN ELECTRIC GENERATOR FOR DRIVING A SUBMERSIBLE PUMP FOR DRAINAGE

(71) Applicant: AIRMAN CORPORATION, Niigata (JP)

(72) Inventors: Shinichiro Takahashi, Niigata (JP); Yuichi Kaneko, Niigata (JP)

(73) Assignee: AIRMAN CORPORATION, Niigata (JP)

( * ) Notice: Subject to any disclaimer, the term of this patent is extended or adjusted under 35 U.S.C. 154(b) by 0 days.

(21) Appl. No.: 18/191,182

(22) Filed: Mar. 28, 2023

(65) Prior Publication Data
US 2024/0113643 A1 Apr. 4, 2024

(30) Foreign Application Priority Data
Oct. 3, 2022 (JP) .................................. 2022-159582

(51) Int. Cl.
*H02P 9/08* (2006.01)
*H02P 101/25* (2016.01)

(52) U.S. Cl.
CPC ............ *H02P 9/08* (2013.01); *H02P 2101/25* (2015.01)

(58) Field of Classification Search
CPC .......... F02D 29/00; F02D 29/04; F02D 29/06; F02D 41/042; F02D 41/065; H02P 2101/25; H02P 9/08
See application file for complete search history.

(56) References Cited

FOREIGN PATENT DOCUMENTS

JP 2012-110098 A 6/2012
JP 5139236 B2 2/2013

*Primary Examiner* — Tulsidas C Patel
*Assistant Examiner* — S. Mikailoff
(74) *Attorney, Agent, or Firm* — Rankin, Hill & Clark LLP

(57) ABSTRACT

To provide an operation control method, in which a state (water level) of a monitored place (water source) is monitored, and when the state of the monitored place satisfies a predetermined start condition in a standby state where the engine of an engine-driven electric generator stops, an engine is started; the inverter device is caused to perform output to gradually increase a frequency from a predetermined low frequency (e.g., 0 Hz) to a predetermined set frequency (e.g., 60 Hz); and the output of a predetermined steady frequency (e.g., 60 Hz) is continued to be performed. Then, when the state of the monitored place satisfies a predetermined stop condition (lower than the lower limit water level), the inverter device is caused to stop an output and the engine is caused to stop to transit to the standby state.

12 Claims, 10 Drawing Sheets

OPERATION CONTROL METHOD FOR ENGINE-DRIVEN ELECTRIC GENERATOR AND ENGINE-DRIVEN ELECTRIC GENERATOR FOR DRIVING A SUBMERSIBLE PUMP FOR DRAINAGE

BACKGROUND OF THE INVENTION

1. Field of the Invention

The present invention relates to an operation control method for an engine-driven electric generator and an engine-driven electric generator executing the operation control method.

2. Description of the Related Art

Engine-driven electric generators including an electric generator main body and an engine that drives the electric generator, in particular, electric generators that are packaged to have portability by, for example, housing the electric generator main body and the engine together in a sound proofing box, are widely used as a power source in construction sites, event venues, areas damaged by disaster, and the like.

Electrical devices driven by receiving the supply of electric power generated by the engine-driven electric generator include an electrical device including a motor, such as a three-phase induction motor (hereinafter, the electrical device including a motor is referred to as "motor device" in the specification).

As a usage example of such a motor device, in a case where water in a water source generated in a construction site or the like is drained by a submersible pump, power feeding from the engine-driven electric generator is initiated when water accumulates in the water source to start the submersible pump, thereby initiating the drainage. On the other hand, when the water in the water source decreases to a predetermined water level and drainage becomes unnecessary, power feeding from the engine-driven electric generator to the submersible pump is stopped to stop the submersible pump, thereby avoiding idling of the submersible pump.

The initiation and stop of the power feeding to the motor device, such as the submersible pump, can also be performed by, for example, connecting a distribution board to a three-phase output terminal block disposed in the engine-driven electric generator, connecting the submersible pump to the distribution board, and having an operator perform a manual switching operation of a switch disposed in the distribution board.

However, in consideration of complication for an operator to manually perform the start and stop of the submersible pump while monitoring the water level of the water source, it is also practiced that a float switch is disposed in the submersible pump, and the float switch turns ON and OFF according to a change in the water level of the water source, thereby allowing the start and stop of the submersible pump.

However, even when the start and stop of the submersible pump are performed by any of the above methods, all of these methods are to control the behavior of the submersible pump and not to perform any control to the behavior of the engine-driven electric generator.

In view of this, even when the submersible pump is stopped and the power feeding becomes unnecessary, the engine-driven electric generator continues operation at a rated rotation speed, leading to an increased running cost for a fuel consumed during the period.

Therefore, the invention of Japanese Patent No. 5139236 referred below proposes that ON and OFF signals of a float switch be used not only for the start and stop of a submersible pump but also for the operation control of an engine-driven electric generator to put the engine of the engine-driven electric generator into idling operation when the submersible pump is stopped, thereby reducing a fuel consumption quantity.

Specifically, when the submersible pump is stopped based on a detection signal of the float switch, electric power supply to the submersible pump is cut off to stop the submersible pump, and the engine is switched to idling operation. When the submersible pump is started, the engine is switched to operation at a rated rotation speed, and the power feeding to the submersible pump is started after the rotation speed of the engine reaches the rated rotation speed (see Japanese Patent No. 5139236).

Note that engine-driven electric generators include an electric generator referred to as a so-called "inverter generator" that includes an inverter device. The inverter generator converts the alternating current that an electric generator main body generates into direct current once by the inverter device, and afterwards converts it into alternating current of a predetermined frequency, allowing outputting the alternating current to an external load, such as a motor device.

Japanese Patent Application Laid-open No. 2012-110098 (Japanese Patent No. 5735780) referred below discloses one that includes, as such an inverter generator, an inverter device designed to gradually increase a frequency from a predetermined low frequency at the start of an output and afterwards, when the frequency reaches a set frequency, maintain the output of the set frequency (see Japanese Patent Application Laid-open No. 2012-110098 (Japanese Patent No. 5735780)).

The engine-driven electric generator disclosed in Japanese Patent No. 5139236 referred above ensures reduction in fuel consumption quantity and generated noise by putting the engine that drives the electric generator main body into idling operation when a motor device (submersible pump) is stopped, compared with a case where the engine operation continues at a rated rotation speed even when the motor device is stopped.

However, although the fuel consumption quantity can be reduced compared with the case where the operation continues at the rated rotation speed, the engine still continues to consume a fuel after transitioning to the idling operation. Meanwhile, power feeding to the motor device is not performed during the idling operation.

In view of this, since the fuel consumed during the idling operation becomes a useless fuel that does not contribute generation of electric power consumed in the motor device, the engine-driven electric generator of Japanese Patent No. 5139236 still has room for improvement in fuel efficiency.

In addition, the engine-driven electric generator of Japanese Patent No. 5139236 starts the power feeding to the motor device in a state where the engine is operated at the rated rotation speed, and thus, in a state where the electric generator main body generates three-phase alternating current of a rated frequency. Accordingly, the motor device is started by direct-on-line starting (full-voltage starting).

When such direct-on-line starting (full-voltage starting) is performed, a large starting current that is three to six times or more of a rated current of a motor device is generated. Consequently, a large-sized engine-driven electric generator that includes a large-sized electric generator main body that can generate an output corresponding to such a large starting current and a large-sized engine that can drive the electric generator main body should be used.

Meanwhile, once the motor device is started to allow driving by applying the rated current, such a large-sized engine-driven electric generator is excessive to the motor device as a power feeding target and increases the fuel consumption quantity.

In view of this, it is desired that the start of a similar motor device can be performed with a smaller-sized engine-driven electric generator.

Furthermore, in the engine-driven electric generator of Japanese Patent No. 5139236, since the engine rotation speed is maintained constant at the rated rotation speed during the motor device actuation, the electric generator main body driven by the engine only outputs the three-phase alternating current at the rated frequency. The rotation speed of the motor device driven by the power feeding from the engine-driven electric generator is always constant (high speed) and cannot be decelerated.

Consequently, in a case where the motor device is the above-described submersible pump, when drainage is completed in a relatively short time by operating the submersible pump at a high speed, for example, when a water storage capacity of a water source is relatively low, and a water inflow speed to the water source is gentle, the submersible pump frequently repeats the start by direct-on-line starting and the stop, thereby possibly increasing power consumption, and thus, fuel consumption quantity.

In such a case, the fuel consumption quantity can be reduced in some cases when the submersible pump is continuously operated by decreasing the rotation speed of the submersible pump according to a water inflow amount to the water source, compared with when the start and stop are frequently repeated.

Furthermore, in the case where the motor device is the above-described submersible pump, smoother drainage can be performed in some cases by changing the rotation speed of the submersible pump according to a water level change or the like of the water source.

Note that Japanese Patent Application Laid-open No. 2012-110098 (Japanese Patent No. 5735780) referred above discloses an engine-driven inverter generator that includes an inverter device designed to gradually increase a frequency from a predetermined low frequency at the start of an output and afterwards, when the frequency reaches a set frequency, maintain the output of the set frequency.

However, Japanese Patent Application Laid-open No. 2012-110098 (Japanese Patent No. 5735780) does not at all disclose nor suggest how an engine control is performed in association with the start and stop of a motor device.

In addition, it is disclosed that in the inverter generator of Japanese Patent Application Laid-open No. 2012-110098 (Japanese Patent No. 5735780), the inverter device is designed to gradually increase a frequency from a predetermined low frequency at the start of an output and afterwards, when the frequency reaches a set frequency, maintain the output of the set frequency. However, no other frequency control is disclosed or suggested.

In the above description, corresponding to the embodiment disclosed in Japanese Patent No. 5139236, problems with the operation control method for the engine-driven electric generator when the submersible pump that starts and stops based on a detection signal of the float switch that detects the water level of a water source is the power feeding target has been described.

However, similar problems can occur in general cases where power feeding is performed to a motor device (for example, submersible pump, ventilation fan, compressor, and the like) that starts and stops based on a state of a monitored place (for example, the water level of a water source, room temperature, the pressure inside a flow passage on a consumption side, and the like) detected by a detecting means (hereinafter referred to as "detector"). Examples of the cases include a case where the power feeding target is a ventilation fan (motor device) that starts and stops based on a detection signal of a temperature sensor that detects a room temperature to control the room temperature, and a case where the power feeding target is a motor-driven compressor that starts and stops based on a detection signal of a pressure sensor that detects a pressure of compressed air inside a flow passage on a consumption side to supply the compressed air according to a consumption quantity of the compressed air on the consumption side.

Therefore, the present invention has been made to eliminate the drawbacks in the above-described related art, and an object of the present invention is to provide an operation control method that ensures further reduction in fuel consumption quantity in an engine-driven electric generator that performs power feeding to a motor device that starts and stops according to a state of a monitored place and an engine-driven electric generator that executes the operation control method.

SUMMARY OF THE INVENTION

Means for solving the problems are described below with reference numerals used in the detailed description of the preferred embodiments. These reference numerals are intended to clarify the correspondence between the descriptions in the claims and the descriptions in the detailed description of the preferred embodiments, and it is needless to say that these reference numerals should not be used to restrictively interpret the technical scope of the present invention.

In order to achieve the object of the present invention, an operation control method for an engine-driven electric generator 1 of the present invention, the engine-driven electric generator 1 including an engine 10; an electric generator main body 20 driven by the engine 10; and an inverter device 30 that converts an alternating current (AC) input from the electric generator 20 into a converted AC having a predetermined frequency, and the inverter device outputting the converted AC to an external load:

comprises the steps of:

providing a submersible pump as the external load for draining water from a water source; and monitoring the water level of the water source;

as a result of the monitoring, wherein in a standby state in which the engine being stopped and an output of the inverter device being stopped, when the water level of the water source is equal to or higher than a predetermined upper limit water level H, starting the engine 10, then operating the engine at a predetermined rated rotation speed; and then increasing a frequency of the AC output of the inverter device 30 from 0 Hz frequency to a predetermined set frequency (60 Hz as an example) at a speed capable of suppressing an increase in a starting current of the submersible pump;

as a result of the monitoring, wherein in a state where the engine is operated at the rated rotation speed, when the water level of the water source is lower than a predetermined lower limit water level L, stopping the AC output of the inverter device 30; and stopping the engine after stopping the AC output of the inverter device and then transferring to the standby state.

In the operation control method for the engine-driven electric generator 1 with the above configuration, setting of the set frequency may be changeable (changeable in a range of 60 Hz to 30 Hz as an example).

The frequency of the AC output of the inverter device 30 may be maintained at the set frequency until the water level of the water source becomes lower than the lower limit water level L after the frequency of the AC output of the inverter device is increased to the set frequency.

Alternatively, when the water level of the water source is lower than the upper limit water level H and equal to or higher than the lower limit water level L after the frequency of the AC output of the inverter device 30 is increased to the set frequency, the frequency of the AC output of the inverter device may be increased or decreased within a range equal to or lower than the set frequency in accordance with the increase or decrease in the water level of the water source.

Moreover, it may be configured that the engine is stopped on a condition that the water level of the water source is not equal to or higher than the upper limit water level H after the AC output of the inverter device is stopped, and when the water level of the water source is equal to or higher than the upper limit water level H, operation of the engine 10 is continued, and the frequency of the AC output of the inverter device 30 is increased again to the set frequency at a speed capable of suppressing an increase in the starting current of the submersible pump.

An engine-driven electric generator 1 of the present invention comprising an engine 10; an electric generator 20 driven by the engine 10; and an inverter device 30 that converts an alternating current (AC) input from the electric generator 20 into a converted AC having a predetermined frequency, and the inverter device outputting the converted AC to an external load; further comprises:
  a three-phase output terminal block 40 connected to the inverter device 30, and the three-phase output terminal block 40 also connected to a submersible pump 60 placed in a water source as the external load;
  a detector connection port 45 for connecting a detector 70, the detector 70 being a float type water level sensor or an electrode type water level sensor and detecting the water level of the water source, and the detector connection port 45 receiving a detection signal input from the detector 70 (float switches as an example); and
  a controller 50 that controls operation of both the engine 10 and the inverter device 30 based on the detection signal from the detector 70 input via the detector connection port 45,
  wherein in a standby state in which being the engine stopped and being an output of the inverter device stopped, when the controller 50 determines based on the detection signal from the detector 70 that the water level of the water source is equal to or higher than a predetermined upper limit water level H, the controller 50 starts the engine 10, then operates the engine 10 at a predetermined rated rotation speed, and then increases a frequency of the AC output of the inverter device 30 from 0 Hz to a predetermined set frequency (60 Hz as an example) at a speed capable of suppressing an increase in a starting current of the submersible pump 60; and
  wherein in a state where the engine is operated at the rated rotation speed, when the controller 50 determines based on the detection signal from the detector 70 that the water level of the water source is lower than a predetermined lower limit L of the water level, the controller 50 stops the AC output of the inverter device 30, and stops the engine 10 after the AC output of the inverter device is stopped and then transfers to the standby state.

In the engine-driven electric generator 1 with the above configuration, the engine-driven electric generator 1 may include a frequency setting means (a dial switch as an example) that allows changing setting of the set frequency (changeable in a range of 60 Hz to 30 Hz as an example).

The engine-driven electric generator 1 may be configured that the controller 50 increases the frequency of the AC output by the inverter device 30 to the set frequency and then maintains the frequency of the AC output of the inverter device 30 at the set frequency until the water level of the water source becomes lower than the lower limit water level L.

Alternatively, the engine-driven electric generator may be configured that when the controller 50 increases the frequency of the AC output by the inverter device 30 up to the set frequency, and then, the water level of the water source is lower than the upper limit water level H and equal to or higher than the lower limit water level L, the frequency of the AC output by the inverter device 30 is increased or decreased within a range equal to or lower than the set frequency in accordance with the increase or decrease in the water level of the water source.

Moreover, the engine-driven electric generator 1 may be configured that the controller 50 stops the engine after stopping the AC output of the inverter device and on the condition that the water level of the water source is not equal to or higher than the upper limit water level H, and
  when the water level of the water source is equal to or higher than the upper limit water level H, the controller 50 continues to operate the engine 10, and increases the AC output of the inverter device 30 again to the set frequency at a speed capable of suppressing an increase in the starting current of the submersible pump.

By controlling the operation of the engine-driven electric generator 1 by the operation control method according to the present invention described above, the following remarkable effects can be obtained.

The engine 10 is also stopped in a state where the output of the inverter device 30 is stopped, and thus, in a state where power feeding to the motor device 60 is not performed. This allows further reduction in fuel consumption quantity of the engine-driven electric generator 1 and reduction in noise generated in the engine-driven electric generator 1 compared with the operation control method disclosed in Japanese Patent No. 5139236 referred above that puts the engine 10 into idling operation without stopping it even when the power feeding to the motor device 60 is stopped.

The inverter device 30 is caused to execute the start output process of starting an output so as to gradually increase a frequency from a predetermined low frequency to a predetermined set frequency each time the power feeding to the motor device 60 is started. This allows performing the start of the motor device 60 in a state where an increase in a starting current is constantly suppressed.

Consequently, compared with the operation control method of Japanese Patent No. 5139236 in which the motor device (submersible pump) 60 is constantly started by direct-on-line starting (constant voltage starting), the similar motor device 60 can be started with the small-sized engine-driven electric generator 1, ensuring further reduction in fuel consumption quantity in association with downsizing of the engine-driven electric generator 1.

With the configuration described above in which the set frequency changeable, the frequency output to the motor device 60, and thus, the rotation speed of the motor device 60 can be changed, and the motor device 60 can be operated at an appropriate rotation speed according to a use state.

Consequently, for example, even when the submersible pump 60 is used as a motor device in a water source having a low water storage capacity and a relatively small water inflow amount, the submersible pump 60 is operated at a low rotation speed corresponding to the water inflow amount to suppress a drainage amount. This can avoid the motor device 60 frequently repeating the start and stop and in association with this, the engine 10 frequently repeating the start and stop.

Meanwhile, as is evident from the correlation between an output frequency of an engine-driven inverter generator and a fuel consumption quantity illustrated in FIG. 7, compared with the fuel consumption quantity when the output frequency of the inverter device 30 is 50 Hz, the fuel consumption quantity when the output frequency is 30 Hz is ½ or less, and it is clear that a significant reduction in fuel consumption quantity is possible by decreasing the output frequency.

Therefore, by decreasing the output frequency of the inverter device 30, and thus, the rotation speed of the motor device 60 according to the use state of the motor device 60, further reduction in fuel consumption quantity can be ensured.

When the inverter device 30 is caused to perform a steady output process following the start output process, the steady frequency can be configured to be a frequency identical to the above-described set frequency and maintain the frequency constant so as not to change during the steady output process. However, in a configuration in which a middle state between a state where the start condition is satisfied (such as a state of an upper limit water level H or higher) and a state where the stop condition is satisfied (such as a state of lower than a lower limit water level L) is monitored to change the steady frequency during the steady output process according to the above-described middle state, for example, when water accumulating in a water source is drained with the submersible pump 60 as a motor device, it is possible to perform a control to decrease the rotation speed of the submersible pump 60 with decreasing the water level of the water source. This allows driving the motor device 60 at an appropriate rotation speed according to a progress state of work, for example, allowing avoidance of sucking dirt and the like accumulating on the bottom of the water source.

Moreover, by decreasing the frequency of the AC output of the inverter device to a frequency lower than the set frequency according to the state of the water level or the like, as illustrated in FIG. 7, the fuel consumption quantity can be reduced in association with a decrease in the output frequency.

Note that the engine stop process can be executed on the condition that the start output process (such as the upper limit water level H or higher) is not satisfied after the inverter device 30 is stopped. When the start condition is satisfied, the operation of the engine 10 can be continued without executing the above-described engine stop process and the inverter device 30 can be caused to perform the start output process again.

Accordingly, for example, when the motor device 60 is a submersible pump, drainage can resume by restarting the submersible pump 60 again without stopping the engine 10 in a case where the water level returns to the water level of the start condition (upper limit water level H or higher) in a relatively short time by stopping the output of the inverter device 30 to stop the submersible pump 60, such as a case where a relatively large amount of water flows in the water source having a low water storage capacity. This allows avoidance of frequent repetition of the start and stop of the engine.

BRIEF DESCRIPTION OF THE DRAWINGS

The objects and advantages of the invention will become understood from the following detailed description of preferred embodiments thereof in connection with the accompanying drawings in which like numerals designate like elements, and in which.

DETAILED DESCRIPTION OF THE PREFERRED EMBODIMENTS

The following describes an exemplary configuration of an engine-driven electric generator that executes the operation control method according to the present invention with reference to the accompanying drawings.

Note that in the embodiment described below, the following case will be described as an example. In the case, a submersible pump is a motor device that receives the supply of electric power from the engine-driven electric generator, and using a water level of a water source generated in a construction site or the like as a "state of a monitored place," it is determined that a start condition of the submersible pump is satisfied when the water level of the water source becomes a predetermined upper limit water level H or higher, and it is determined that a stop condition of the submersible pump is satisfied when the water level of the water source becomes lower than a predetermined lower limit water level L.

However, the operation control method for an engine-driven electric generator according to the present invention is not limited to the above-described case in which the submersible pump is the power feeding target. The operation control method can be widely used for controls for various motor devices that can start and stop according to a change in the state of a monitored place (pressure, density, gas concentration, and the like, in addition to water level and temperature) as the power feeding target. The operation control method is not limited to the usage described below.

[Overall Configuration of Engine-Driven Electric Generator]

Figure 1:
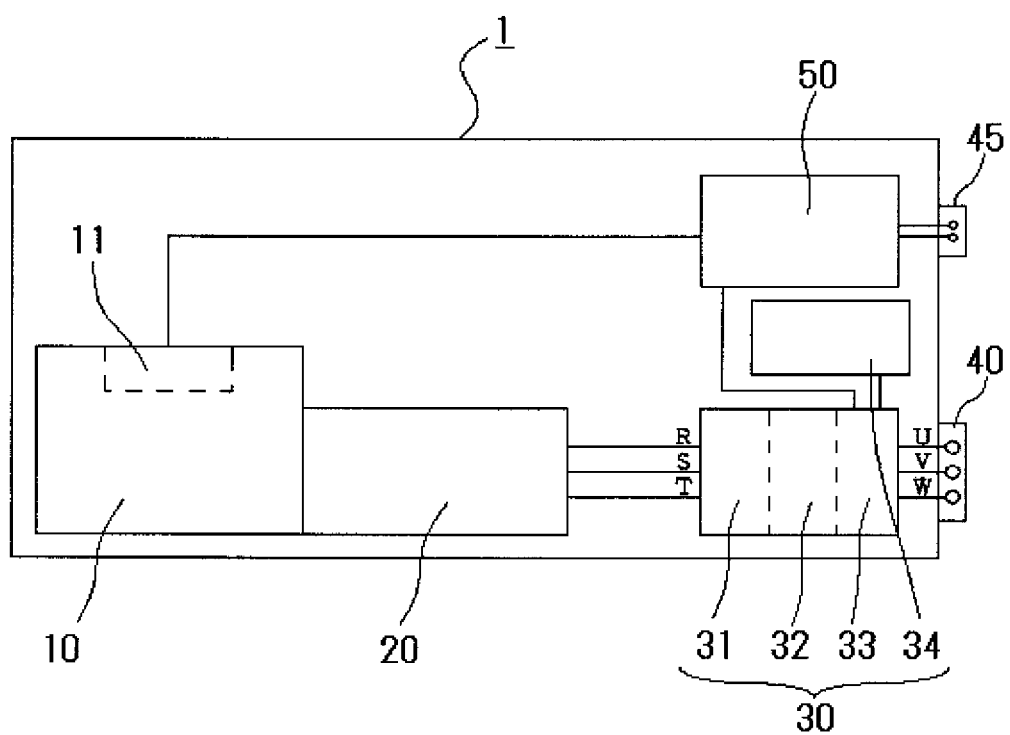
FIG. 1 is a function block diagram of an engine-driven electric generator according to the present invention.

The reference numeral 1 in FIG. 1 denotes the engine-driven electric generator according to the present invention. An engine-driven electric generator 1 includes an engine 10, an electric generator 20 driven by the engine 10, and an inverter device 30 connected to the electric generator 20 via an output line.

A three-phase output terminal block 40 is further connected to the inverter device 30. In the embodiment, as illustrated in FIGS. 2A to 2C, a submersible pump 60 installed in a water source is connected as a motor device to the three-phase output terminal block 40.

The engine-driven electric generator 1 further includes a detector connection port 45 and a controller 50, the detector connection port 45 is configured such that a detector 70 can be connected and the controller 50 controls the operation of both the engine 10 and the inverter device 30 based on a detection signal from the detector 70 input via the detector connection port 45.

Figure 2A:
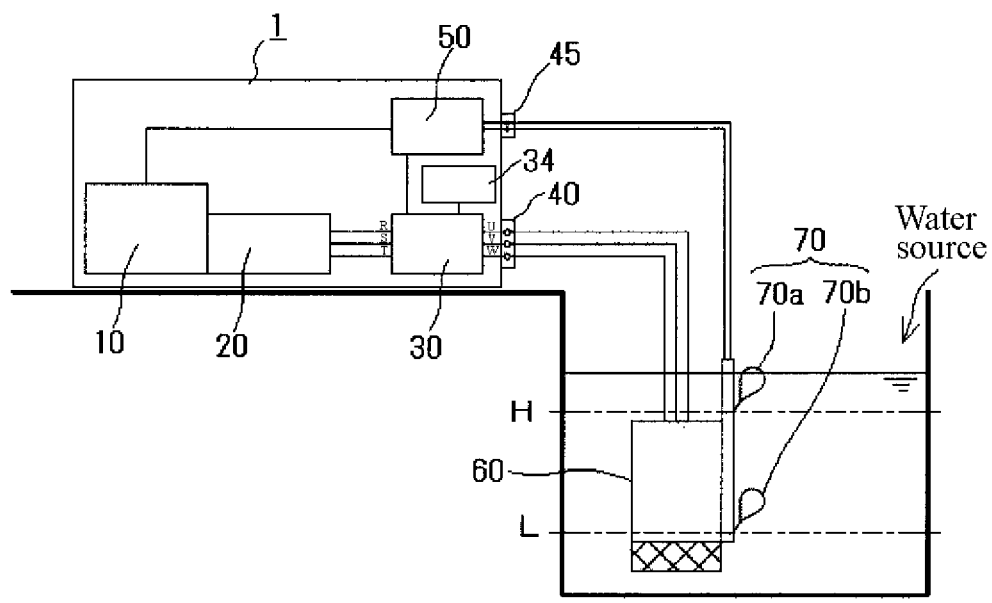
FIG. 2A is an explanatory drawing of a use state of the engine-driven electric generator in which a submersible pump is a motor device as a power feeding target and illustrates a state where a water level of a water source is an upper limit water level H or higher.
Figure 2B:
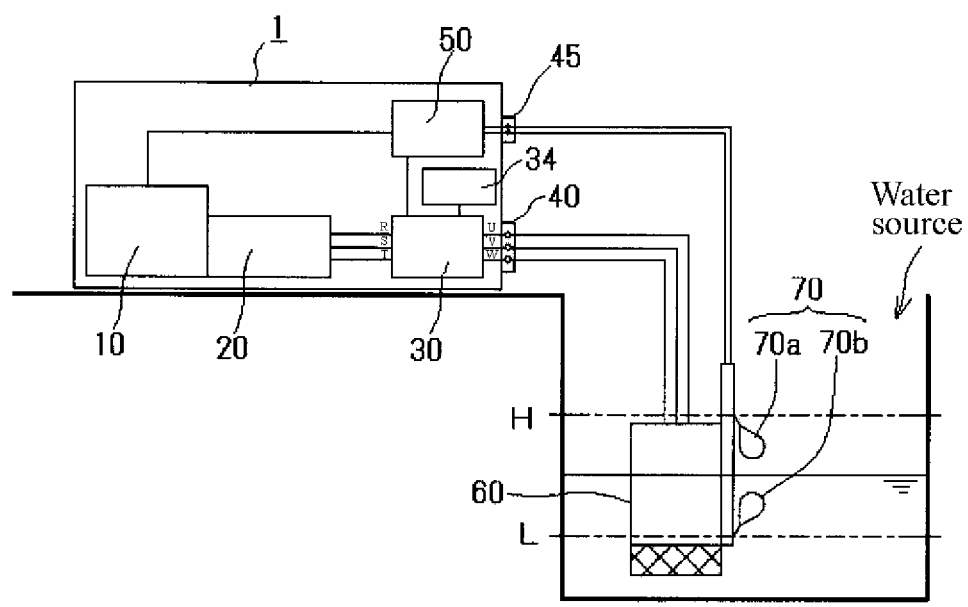
FIG. 2B is an explanatory drawing of a use state of the engine-driven electric generator in which the submersible pump is the motor device as the power feeding target and illustrates a state where the water level of the water source is a lower limit water level L or higher.
Figure 2C:
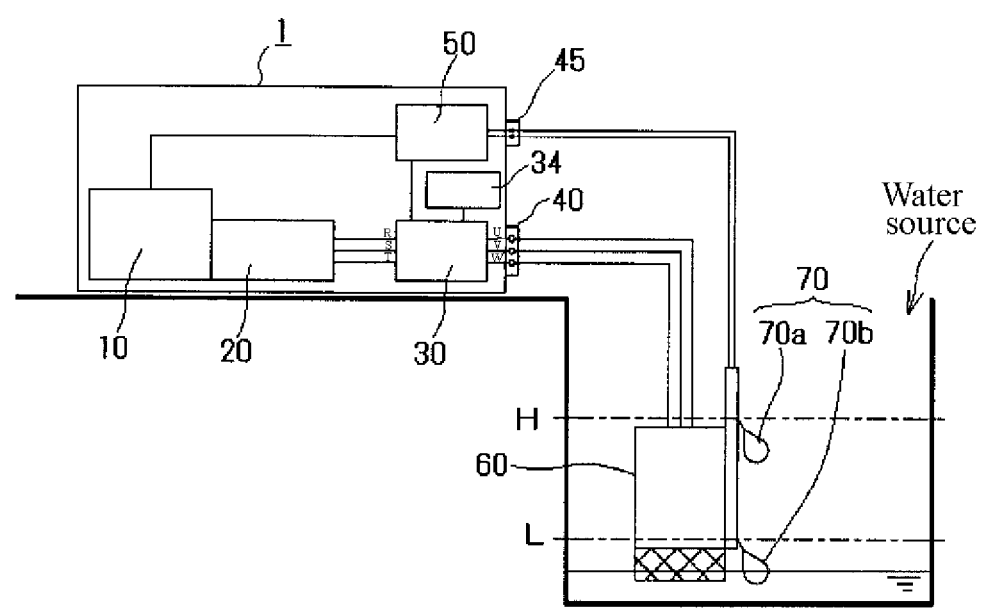
FIG. 2C is an explanatory drawing of a use state of the engine-driven electric generator in which the submersible pump is the motor device as the power feeding target and illustrates a state where the water level of the water source is lower than the lower limit water level L.

In the embodiment, as illustrated in FIGS. 2A to 2C, float switches 70 (70a, 70b) are disposed as a detector that monitors the water level of the water source in which the above-described submersible pump 60 is installed. The float switches 70 (70a, 70b) are connected to the above-described detector connection port 45.

In the embodiment illustrated in FIGS. 2A to 2C, an upper stage side float switch 70a and a lower stage side float switch 70b are disposed. The upper stage side float switch 70a turns ON when the water level of the water source is the predetermined upper limit water level H or higher and turns OFF when it is lower than the upper limit water level H. The lower stage side float switch 70b turns ON when the water level of the water source is the predetermined lower limit water level L or higher and turns OFF when it is lower than the lower limit water level L. The upper stage side float switch 70a can detect that the water level of the water source becomes the predetermined upper limit water level H or higher (that the start condition is satisfied). The lower stage side float switch 70b can detect that the water level of the water source becomes lower than the predetermined lower limit water level L (that the stop condition is satisfied). Both the upper stage side float switch 70a and the lower stage side float switch 70b are connected to the detector connection port 45, and the controller 50 can receive detection signals from the float switches 70 (70a, 70b).

[Electric Generator]

As the above-described electric generator 20 that is one of main constituting members of the engine-driven electric generator 1, various known models can be used without being specifically limited. In the embodiment, a self-excited three-phase AC generator (three-phase 200 V) that can obtain a stable output voltage of a set value by an automatic voltage regulator (AVR) is used as the electric generator 20.

The electric generator 20 is configured to obtain a predetermined commercial frequency (50 Hz or 60 Hz) by being driven by the engine 10 operated at a rated rotation speed. In the embodiment, the rated rotation speed of the engine 10 is configured to be switchable between 1500 $min^{-1}$ and 1800 $min^{-1}$. The electric generator 20 is configured such that an AC output of frequency 50 Hz is obtained from the electric generator 20 when the engine 10 is operated at the rated rotation speed of 1500 $min^{-1}$, and an AC output of frequency 60 Hz is obtained from the electric generator 20 when the engine 10 is operated at the rated rotation speed of 1800 $min^{-1}$.

[Inverter Device]

The above-described inverter device 30 includes a converter unit 31, an inverter unit 32, and an output control unit 33. The converter unit 31 converts the alternating current from the electric generator 20 into direct current. The inverter unit 32 converts the direct current obtained in the converter unit 31 into alternating current of any frequency. The output control unit 33 controls the initiation and stop of an output of the inverter device 30 and an output frequency. The inverter device 30 is configured to be able to generate an AC output of a set frequency set by a frequency setting means 34 formed of a dial switch and the like disposed on a control panel or the like by, for example, a known pulse-width modulation (PWM) method. The inverter device 30 is set to also change an output voltage in response to an increase and a decrease in frequency such that the output voltage becomes low when the set frequency is set to be low and the output voltage becomes high when the set frequency is set to be high.

The inverter device 30 has its behavior controlled by a command from the controller 50 composed of an electronic control device or the like. In the illustrated embodiment, the inverter device 30 is configured such that the output control unit 33 disposed in the inverter device 30 receives an output initiation command from the controller 50 to initiate an output of the inverter device 30 and receives an output stop command to stop the output of the inverter device 30.

The output control unit 33 of the inverter device 30 executes a start output process when the output of the inverter device 30 is initiated and a steady output process following the start output process. In the start output process, a frequency is gradually increased from a predetermined low frequency (such as zero frequency) to a predetermined set frequency (in the embodiment, 60 Hz as an example) set by the above-described frequency setting means 34. In the steady output process, the output of a steady frequency (here, 60 Hz) that is a predetermined frequency equal to or less than the set frequency (in the embodiment, the same frequency as the set frequency) continues to be performed.

Thus, by gradually increasing the frequency of the AC output (and thus, gradually increasing the voltage) in the start output process, a starting current of the submersible pump 60 can be substantially reduced compared with a case of direct-on-line starting (full-voltage starting).

In addition, the output control unit 33 of the inverter device 30 executes an output stop process of stopping the output of the inverter device 30 when the output stop command is received from the controller 50.

The output stop process may be configured to immediately stop the output of the inverter device 30 by receiving the output stop command from the controller 50. However, in the embodiment, the output stop process is configured to stop the output of the inverter device 30 by gradually decreasing the frequency of the AC output from the above-described steady frequency (60 Hz as an example) to the predetermined low frequency (in the embodiment, zero frequency/zero voltage).

Thus, by configuring to gradually decreasing the output frequency when the output of the inverter device 30 is stopped, the submersible pump 60 stops after the rotation speed is gradually reduced, allowing avoidance of generation of a water hammer phenomenon generated when the submersible pump 60 is suddenly stopped.

Consequently, since strain on the submersible pump 60 during the stop by the water hammer phenomenon is reduced, the life of the submersible pump 60 can be prolonged.

The set frequency output by the inverter device 30 in the start output control may coincide with the commercial frequency (50 Hz or 60 Hz) or may allow being set to be higher or lower than the commercial frequency (50 Hz or 60 Hz). As an example, the set frequency can be changed in a range of 30 Hz to 60 Hz by the setting performed by operating the above-described frequency setting means 34.

[Engine]

The engine 10 mounted in the engine-driven electric generator 1 is, for example, a diesel engine and includes, together with an engine main body, a starter motor, a heater for preheating, a fuel injection pump, and electric components, such as an engine control unit (ECU) 11, that control the behavior thereof.

As an example, the above-described ECU 11 receives a behavior command from the controller 50 to control each unit, thereby executing start and stop processes of the engine 10. As an example, the start of the engine 10 is executed through respective processes of a "key ON" process of starting an electric connection with a battery, a "preheating" process of electrifying the heater for preheating, and an "engine start" process of performing by rotating the starter motor for a predetermined period.

The stop process of the engine 10 is performed through a "key OFF" process of stopping the electric connection with the battery after executing an "engine stop" process of stopping the engine by a known method as a method for stopping the diesel engine, such as stopping of a fuel supply and stopping of intake air.

As described above, the engine 10 has the rated rotation speed of 1500 $min^{-1}$ or 1800 $min^{-1}$. The engine 10 is configured to continue the operation that maintains the rotation speed constant at the preliminary selected rated rotation speed of any of 1500 $min^{-1}$ or 1800 $min^{-1}$ until the stop process is performed after the engine 10 is started by the above-described start process.

[Controller]

The above-described controller 50 outputs command signals to the engine 10 and the inverter device 30 based on detection signals from the float switches 70 (70a, 70b) as the detector connected to the detector connection port 45.

In the embodiment illustrated in FIGS. 2A to 2C, when the upper stage side float switch 70a outputs a detection signal (ON signal) indicating that it detects that the water level of the water source is the upper limit water level H or higher, the controller 50 that receives the detection signal (ON signal) determines that the start condition is satisfied, outputs a start command to the engine 10 to start the engine 10, and afterwards outputs the output initiation command to the inverter device 30.

When the lower stage side float switch 70b outputs a detection signal (OFF signal) indicating that it detects that the water level of the water source is lower than the lower limit water level L, the controller 50 that receives the detection signal (OFF signal) determines that the stop condition is satisfied, outputs the output stop command to the inverter device 30, and outputs a stop command to the engine 10.

Although the illustration is omitted, in the embodiment illustrated in FIG. 1 and FIGS. 2A to 2C, in the engine-driven electric generator 1, an operation mode selection switch connected to the controller 50 is disposed. When an "automatic start operation mode" is selected by the operation mode selection switch, the controller 50 performs a behavior control of the engine 10 and the inverter device 30. However, when an "ordinary operation mode" is selected, the behavior control of the engine 10 and the inverter device 30 by the controller 50 is not performed, and an operator manually operates switches to perform the start and stop of the engine 10 and the output initiation and stop of the inverter device 30.

[Behavior of Engine-Driven Electric Generator]

Figure 3:
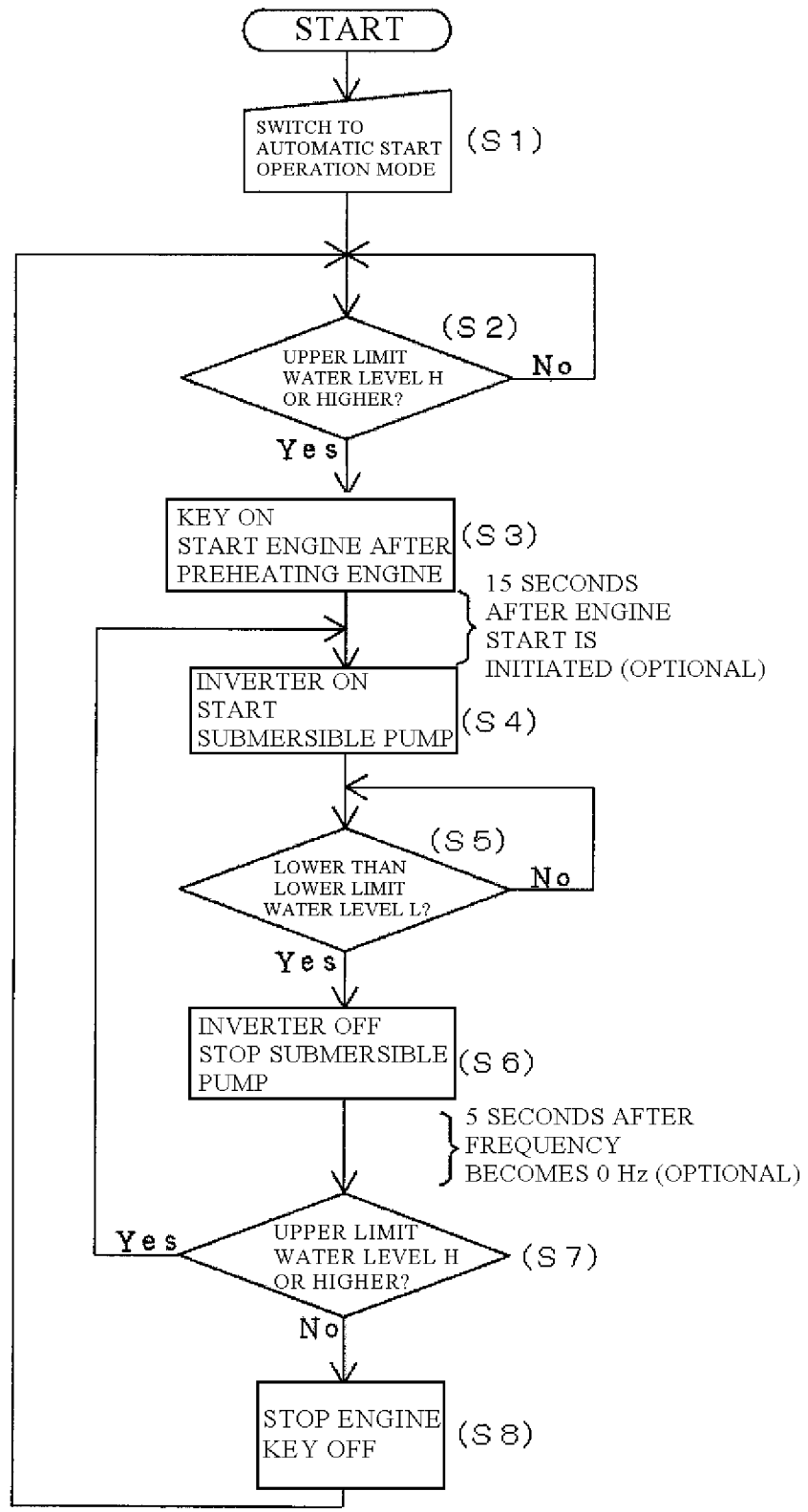
FIG. 3 is a flowchart illustrating the behavior of the engine-driven electric generator in a use example of FIGS. 2A to 2C.

The behavior of the engine-driven electric generator 1 according to the present invention described above with reference to FIG. 1 and FIGS. 2A to 2C will be described with reference to the flowchart of FIG. 3.

The submersible pump 60 is connected to the three-phase output terminal block 40 of the engine-driven electric generator 1 according to the present invention. The upper stage side float switch 70a and the lower stage side float switch 70b that detect the water level of the water source in which the submersible pump 60 is installed are connected to the detector connection port 45.

When the operation mode selection switch (not illustrated) disposed on a control panel is operated to switch the operation mode to the "automatic start operation mode" (S1), the engine-driven electric generator 1 enters a standby state in which the engine-driven electric generator 1 stands by in a state where the engine 10 stops and the output of the inverter device 30 stops.

In the standby state, the controller 50 monitors the water level of the water source based on the detection signals from the float switches 70 (70a, 70b) input via the detector connection port 45 (S2). When the detection signal indicating that the water level of the water source is lower than the upper limit water level H (OFF signal) is received from the upper stage side float switch 70a (No in S2), the controller 50 maintains the above-described standby state. When the detection signal indicating that the water level of the water source is the upper limit water level H or higher (ON signal) is continuously received preferably for a predetermined period (in the embodiment, five seconds as an example) or more (Yes in S2), the controller 50 determines that the start condition is satisfied and outputs the start command to the engine 10.

The ECU 11 of the engine 10 that receives the start command signal from the controller 50 establishes a connection with the battery by the key ON, electrifies the heater for preheating to preheat the engine 10, and afterwards actuates the starter motor for a predetermined period to start the engine 10 (S3). The ECU 11 causes the operation of the engine 10 to continue at the preliminary selected rated rotation speed of any of 1500 $min^{-1}$ or 1800 $min^{-1}$.

After a warm-up operation for a predetermined period (15 seconds as an example) is completed as necessary after the start of the engine 10, the controller 50 outputs the output initiation command to the inverter device 30 to turn the inverter device 30 ON and causes the inverter device 30 to start an output, thereby starting the submersible pump 60 (S4).

The output control unit 33 of the inverter device 30 that receives the output initiation command from the controller 50 executes the start output process when the output is initiated and the steady output process following the start output process. In the start output process, a frequency is gradually increased from a predetermined low frequency (such as zero frequency) to a predetermined set frequency (60 Hz as an example) set by the frequency setting means 34. In the steady output process, the output of a steady frequency (60 Hz as an example) that is a frequency equal to or less than the set frequency (in the embodiment, the same frequency as the set frequency) continues to be performed.

This allows starting the submersible pump 60 connected to the three-phase output terminal block 40 in a state where the starting current is kept low and continues the operation of the submersible pump 60 at a rotation speed corresponding to the above-described set frequency (in the embodiment, 60 Hz as an example) arbitrarily set between 30 Hz and 60 Hz by an operator.

Even after the engine-driven electric generator 1 is started to start the submersible pump 60, the controller 50 continues to monitor the water level of the water source based on the detection signals from the float switches 70 (70a, 70b). Until the water level of the water source becomes lower than the predetermined lower limit water level L, the controller 50 continues the driving of the engine 10 at the rated rotation speed and the output of the inverter device 30 at the steady frequency (No in S5).

When it is detected based on the detection signal (OFF signal) from the lower stage side float switch 70b that the water level of the water source is lower than the lower limit water level L, in the embodiment, that it is lower than the lower limit water level L continuously for a predetermined period (five seconds as an example) (Yes in S5), the controller 50 determines that the stop condition is satisfied and outputs the output stop command to the inverter device 30.

The output control unit 33 of the inverter device 30 that receives the output stop command from the controller 50 decreases the output frequency from the steady frequency (60 Hz as an example) to a predetermined low frequency (0 Hz as an example) over a predetermined period (five seconds as an example), thereby stopping the output of the inverter device 30. This stops the submersible pump 60 (S6).

After the output stop of the inverter device 30, the controller 50 further monitors the water level of the water source based on the detection signals from the float switches 70 (70a, 70b) for a predetermined period (five seconds as an example) as necessary.

When the detection signal indicating that the water level of the water source rises again to be the upper limit water level H or higher (ON signal) is continuously received preferably for a predetermined period (in the embodiment, five seconds as an example) or more (Yes in S7), the controller 50 determines that the start condition is satisfied. The controller 50 outputs the output initiation command to the inverter device 30 to turn the inverter device 30 ON again while causing the operation of the engine 10 to continue without outputting the stop command to the engine 10, and starts the submersible pump 60 (Yes in S7→S4).

At this time, the output control unit 33 of the inverter device 30 causes the inverter device 30 to execute the start output process and the steady output process after the start output process. In the start output process, a frequency is gradually increased from a predetermined low frequency (0 Hz as an example) to a predetermined set frequency (60 Hz as an example). In the steady output process, the output of a predetermined steady frequency (as an example, 60 Hz that is the same frequency as the set frequency in the embodiment) continues to be performed. This restarts the submersible pump 60 in a state where the starting current is lowered.

Meanwhile, when the water level of the water source does not rise to the upper limit water level H or higher even after a predetermined period (five seconds as an example) elapses as necessary from the output stop of the inverter device 30 (No in S7), that is, when the controller 50 does not determine that the start condition is satisfied, the controller 50 outputs the stop command to the engine 10.

The engine 10 that has received the stop command from the controller 50 stops the engine 10 by a known method as a method for stopping the diesel engine, such as stopping of a fuel supply and cutoff of intake air, and afterwards perform the key OFF process to cut off the electric connection with the battery (S8).

This causes the engine-driven electric generator 1 to transition into the standby state where the engine 10 stops and the output of the inverter device 30 stops and maintain the standby state until the controller 50 receives the detection signal indicating that the water level of the water source is the upper limit water level H or higher (ON signal) by the upper stage side float switch 70a, determines that the start condition is satisfied, and outputs the start command to the engine 10.

Modification Example 1

In the embodiment described above with reference to FIGS. 2A to 2C, the following case has been described as an example. In the case, the two float switches of the upper stage side float switch 70a and the lower stage side float switch 70b are disposed as the detector (float switches) 70. The upper stage side float switch 70a detects that the water level of the water source becomes the upper limit water level H or higher. The lower stage side float switch 70b detects that the water level of the water source becomes lower than the lower limit water level L. Based on the determination of whether or not the start condition and the stop condition are achieved performed by the controller 50 based on the detection signals of the float switches 70 (70a, 70b), the operation control of the engine-driven electric generator 1 is performed.

Figure 4A:
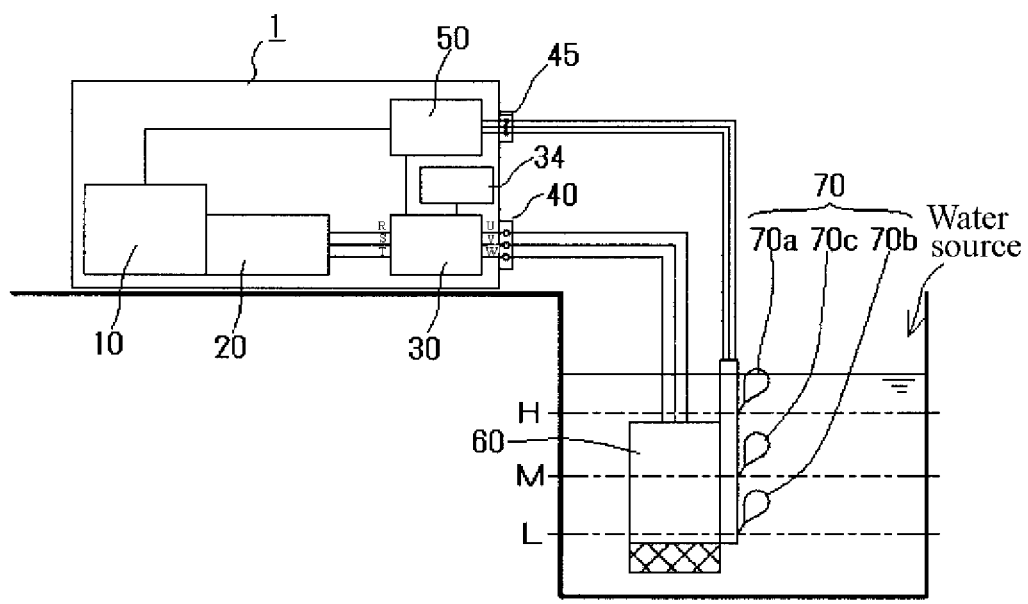
FIG. 4A is an explanatory drawing of a use state of the engine-driven electric generator in which the submersible pump is the motor device as the power feeding target and illustrates a state where the water level of the water source is the upper limit water level H or higher.
Figure 4B:
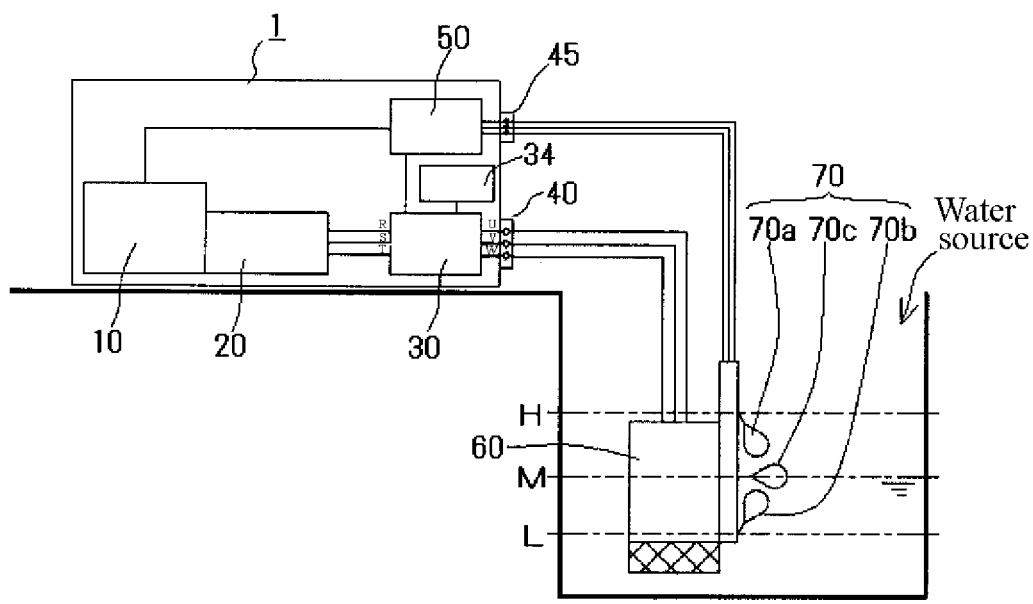
FIG. 4B is an explanatory drawing of a use state of the engine-driven electric generator in which the submersible pump is the motor device as the power feeding target and illustrates a state where the water level of the water source is in a state of a middle water level M.
Figure 4C:
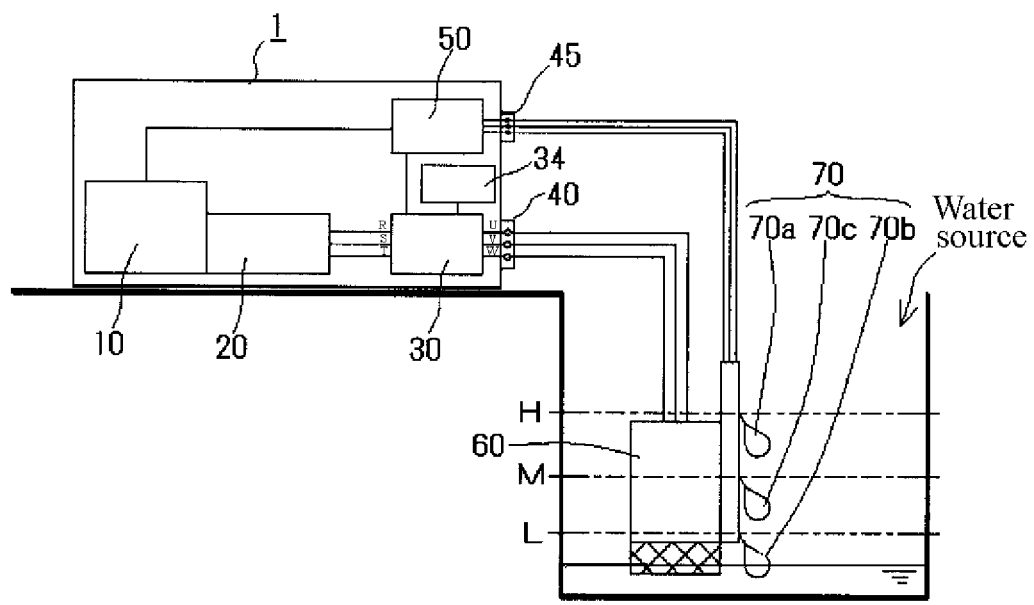
FIG. 4C is an explanatory drawing of a use state of the engine-driven electric generator in which the submersible pump is the motor device as the power feeding target and illustrates a state where the water level of the water source is lower than the lower limit water level L.

In contrast to this, in an embodiment illustrated in FIGS. 4A to 4C, in addition to the upper stage side float switch 70a that detects that the water level of the water source is the upper limit water level H or higher and the lower stage side float switch 70b that detects that it is lower than the lower limit water level L, a middle stage float switch 70c is disposed. The middle stage float switch 70c turns ON when the water level of the water source becomes a middle water level M or higher and turns OFF when it is lower than the middle water level M. The middle water level M is disposed between the upper limit water level H and the lower limit water level L. It is possible to detect that the water level of the water source is the middle water level M or higher based on an ON signal of the middle stage float switch 70c and that the water level of the water source is lower than the middle water level M based on an OFF signal of the middle stage float switch 70c.

Based on a control signal from the controller 50 that receives the detection signal of the middle stage float switch 70c, the output control unit 33 of the inverter device 30 can change a frequency of alternating current output during the steady output process in a range equal to or less than the set frequency.

Figure 5:
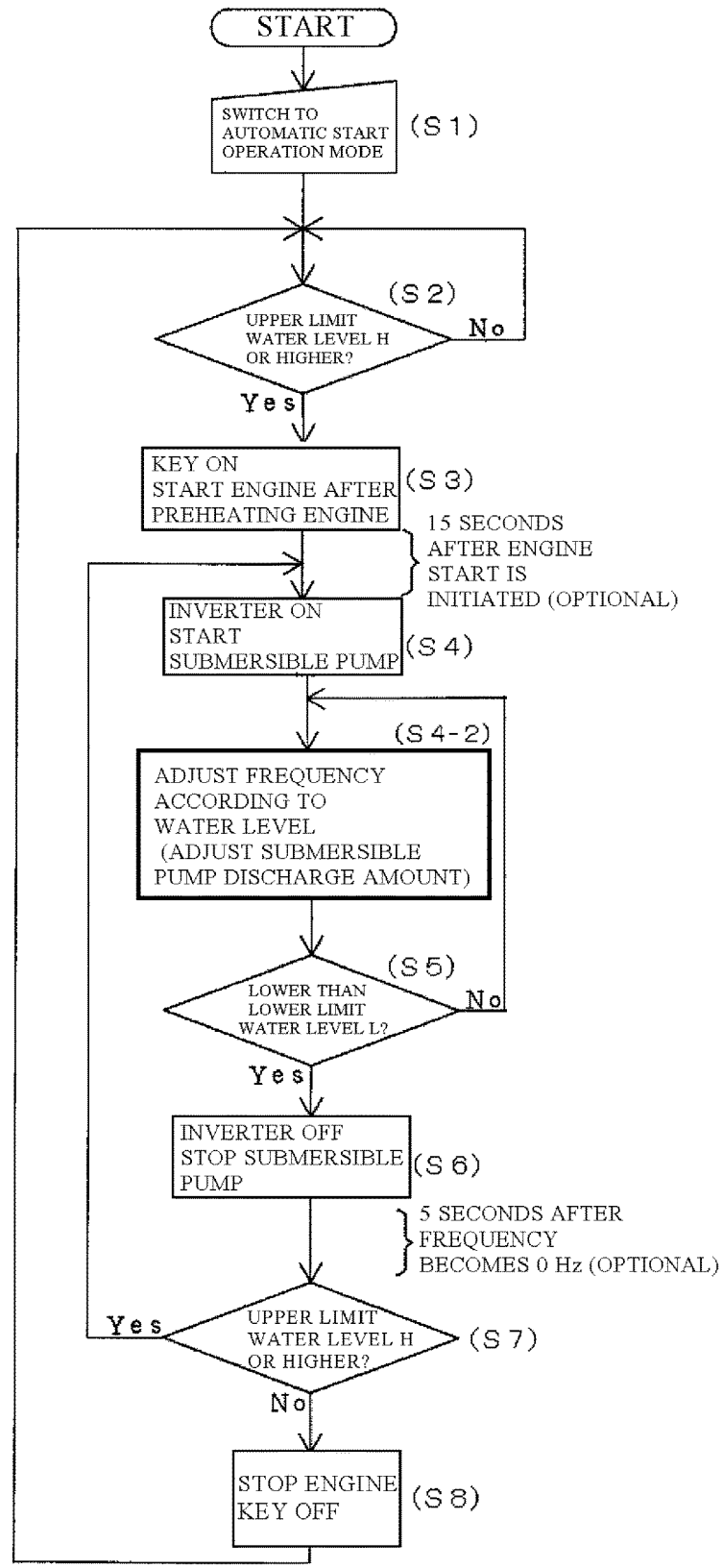
FIG. 5 is a flowchart illustrating the behavior of the engine-driven electric generator in a use example of FIGS. 4A to 4C.

Accordingly, in the operation control method of the embodiment performed taking into consideration the additional detection signal from the middle stage float switch 70c, as illustrated in the flowchart of FIG. 5, a process (S4-2) is added (since other points are similar to those of the embodiment described with reference to FIG. 3, the description is omitted). In the process, between when the inverter device 30 turns ON to start the submersible pump 60 (S4) and when the lower stage side float switch 70b detects that the water level becomes the lower limit water level L or lower (S5) and the controller 50 determines that the stop condition is satisfied, the steady frequency that the inverter device 30 outputs during the steady output process according to the water level detected by the middle stage float switch 70c is changed.

As an example, when the set frequency is set to be 60 Hz by the above-described frequency setting means 34, the inverter device 30 gradually increases a frequency from a predetermined low frequency (0 Hz) to the set frequency (60 Hz) in the start output process, and afterwards, the set frequency (60 Hz) is used as the steady frequency to cause the inverter device 30 to start the steady output process.

When the middle stage float switch 70c detects that the water level of the water source becomes lower than the middle water level M during the execution of the steady output process, the output control unit 33 of the inverter device 30 decreases the steady frequency from 60 Hz to 30 Hz by the control signal from the controller 50 to cause the submersible pump 60 to transition into a low speed operation.

Thus, the water level of the water source lowers to be lower than the middle water level M, and the steady frequency output by the inverter device 30 is decreased to 30 Hz. Afterwards, when the middle stage float switch 70c detects the water level equal to or higher than the middle water level M again in a state where the upper stage side float switch 70a detects the water level lower than the upper limit water level H, the controller 50 increases the steady frequency output by the inverter device 30 from 30 Hz described above to 45 Hz to allow operating the submersible pump 60 at a medium speed.

Note that, when the set frequency set by the frequency setting means 34 is set to be lower than 60 Hz, the steady frequency of 30 Hz corresponding to the "low speed" of the submersible pump 60 and the steady frequency of 45 Hz corresponding to the "medium speed" may be set to be lower values in response thereto.

Figure 7:
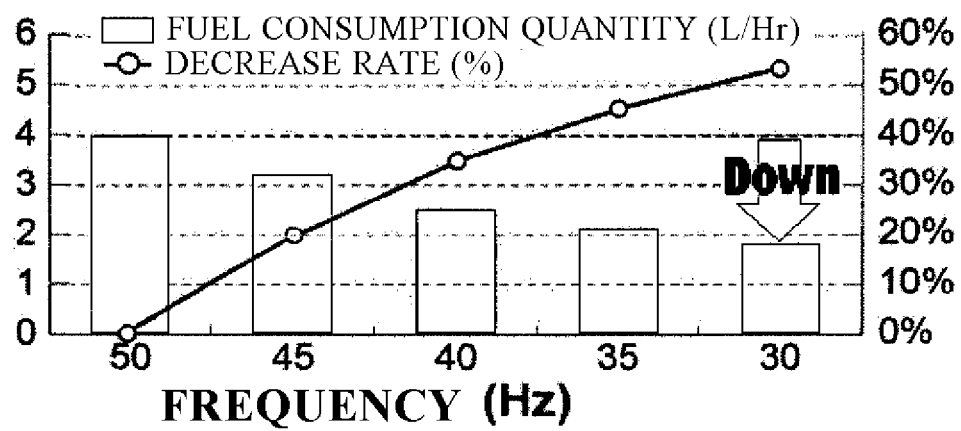
FIG. 7 is a graph illustrating the change in fuel consumption quantity relative to an output frequency of an engine-driven inverter generator.

By thus configuring, sucking and the like of dirt accumulating on the bottom portion of the water source by the submersible pump 60 can be avoided by decelerating the rotation speed of the submersible pump 60 to the low speed with decreasing in the water level by continuous drainage by the submersible pump 60 to slow water flow in the water source. Moreover, from the relationship between the output frequency and the fuel consumption quantity illustrated in FIG. 7, a significant reduction in fuel consumption quantity can be realized by the decrease in the frequency output as the steady frequency.

In the control described above, for example, when a water inflow amount to the water source is more than a drainage amount of the submersible pump 60 that is decelerated to the low speed, and the water level of the water source, which has lowered to lower than the middle water level M once, rises again to the middle water level M or higher by the deceleration of the submersible pump 60 to the low speed, the following control can be performed. In the control, the steady frequency is increased in a range equal to or less than the set frequency (increased to 45 Hz) to set the submersible pump 60 to be at the medium speed, thereby maintaining the water level of the water source constantly in the proximity of the middle water level M.

Modification Example 2

In the above-described embodiment described above with reference to FIGS. 4A to 4C, the upper stage side float switch 70a, the lower stage side float switch 70b, and the middle stage float switch 70c are disposed as the detector (float switches) 70 that detects the water level of the water source. It is possible to detect within which range the water level of the water source falls among the ranges of the upper limit water level H or higher, the middle water level M or higher and lower than the upper limit water level H, the lower limit water level L or higher and lower than the middle water level M, and lower than the lower limit water level L. In response to the detected water level, the steady frequency output at the steady output control can be changed.

Figure 6A:
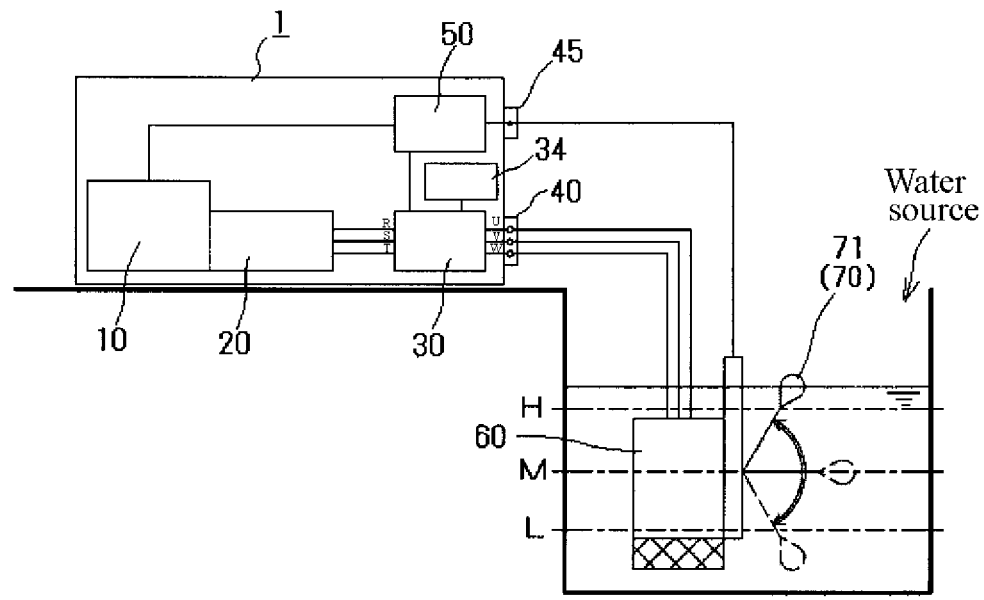
FIG. 6A is an explanatory drawing illustrating an adoption example of a water level detector that can detect change in water level of the water source steplessly between the upper limit water level H and the lower limit water level L and illustrates an example in which a float type water level sensor is disposed as the detector.
Figure 6B:
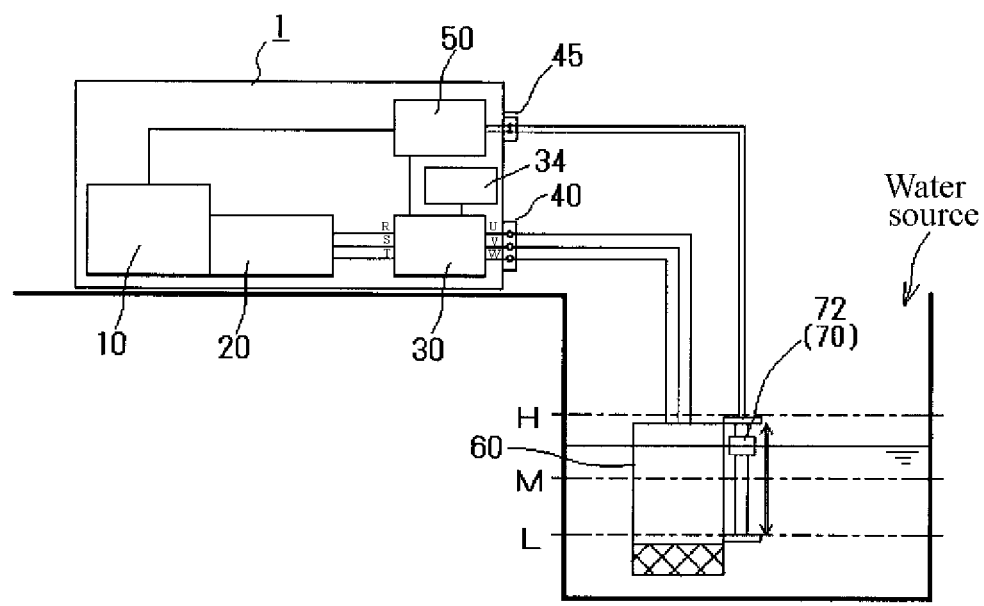
FIG. 6B is an explanatory drawing illustrating an adoption example of the water level detector that can detect change in water level of the water source steplessly between the upper limit water level H and the lower limit water level L and illustrates an example in which a float type water level sensor is disposed as the detector.
Figure 6C:
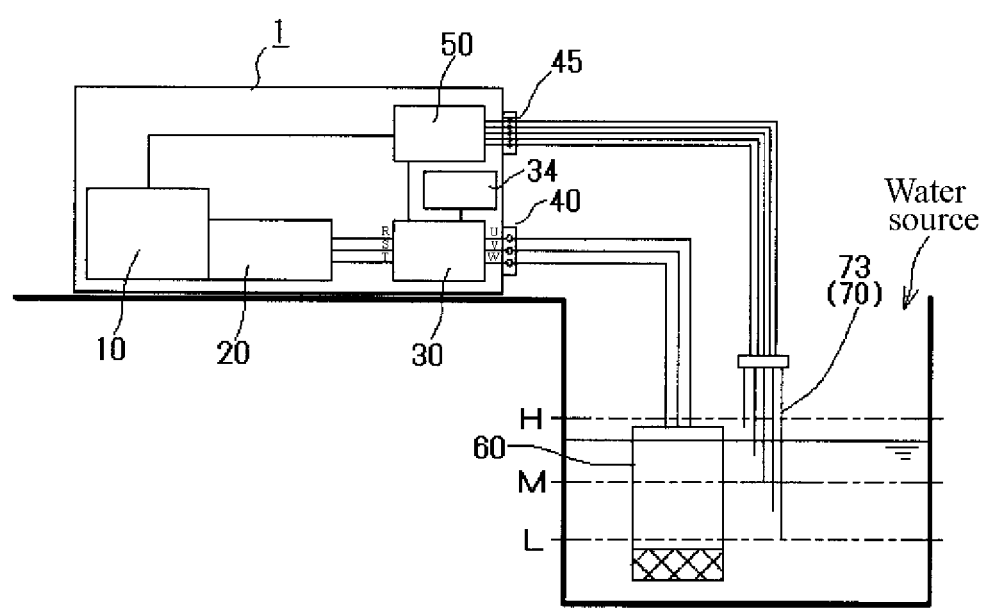
FIG. 6C is an explanatory drawing illustrating an adoption example of the water level detector that can detect change in water level of the water source steplessly between the upper limit water level H and the lower limit water level L and illustrates an example in which an electrode type water level sensor is disposed as the detector.

In contrast to this, in the embodiment illustrated in FIGS. 6A to 6C, the detector 70 [float type water level sensors 71, 72 in FIG. 6A and FIG. 6B/an electrode type water level sensor 73 in FIG. 6C] that can detect a change in the water level of the water source steplessly between the upper limit water level H and the lower limit water level L are disposed. According to the water level detected steplessly by the detector 70 (71, 72, 73), the steady frequency output by the inverter device 30 during the steady output process can be changed to be high according to the rise in the water level and to be low according to the drop in the water level in a range of 60 Hz to 30 Hz as an example.

For example, in a case where a constant amount of water constantly flows into the water source, when the submersible pump 60 is operated at a high speed of the maximum speed, the drainage of the water source is promptly completed, and the stop and start of the engine-driven electric generator 1 are frequently repeated in some cases.

Meanwhile, when the submersible pump 60 is operated at a low speed of a constant speed, it is assumed that the water level of the water source cannot be lowered when the water inflow amount to the water source surpasses the drainage amount of the submersible pump 60.

In contrast to this, as described above, the water level of the water source is detected steplessly, and in response to this, the steady frequency, and thus, the rotation speed of the submersible pump 60 during the steady output process is made variable, thereby allowing control of maintaining the water level of the water source constantly in an approximately constant state and the like.

Thus the broadest claims that follow are not directed to a machine that is configure in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to extremely broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described;

EXPLANATION OF REFERENCE NUMERALS

1. Engine-driven electric generator
10. Engine
11. Engine control unit (ECU)
20. Electric generator main body
30. Inverter device
31. Converter unit
32. Inverter unit
33. Output control unit
34. Frequency setting means
40. Three-phase output terminal block
45. Detection signal input unit
50. Controller
60. Motor device (submersible pump)
70. Detector (float switches)
70a. Upper stage side float switch
70b. Lower stage side float switch
70c. Middle stage float switch
71, 72. Water level sensors (float type)
73. Water level sensor (electrode type)
H. Upper limit water level
L. Lower limit water level
M. Middle water level

What is claimed is:

1. An operation control method for an engine-driven electric generator,
   the engine-driven electric generator including
      an engine;
      an electric generator driven by the engine; and
      an inverter device that converts an alternating current (AC) input from the electric generator into a converted AC output having a predetermined frequency,
      the inverter device outputting the converted AC to an external load;
   the control method comprising:
      providing a submersible pump as the external load for draining water from a water source; and
      monitoring a water level of the water source;
      as a result of the monitoring, when the water level of the water source is equal to or higher than a predetermined upper limit water level and the engine-driven electric generator is in a standby state in which both the engine and the output of the inverter device are stopped;
         starting the engine, then operating the engine at a predetermined rated rotation speed; and then
         gradually increasing a frequency of the converted AC output of the inverter device from zero frequency to a predetermined set frequency to suppress an increase in a starting current of the submersible pump;
      as a result of the monitoring, when the water level of the water source is lower than a predetermined lower limit water level and the engine is operating at the rated rotation speed;
         stopping the converted AC output of the inverter device;
         stopping the engine after stopping the converted AC output of the inverter device; and then
         returning the engine-driven electric generator to the standby state.

2. The operation control method for the engine-driven electric generator according to claim 1,
   wherein the frequency of the converted AC output of the inverter device is increased to the set frequency, and then the frequency of the converted AC output of the inverter device is maintained at the set frequency until the water level of the water source becomes lower than the lower limit water level.

3. The operation control method for the engine-driven electric generator according to claim 1,
   wherein after the frequency of the converted AC output of the inverter device is increased to the set frequency, when the water level of the water source is lower than the upper limit water level and equal to or higher than the lower limit water level,
   the frequency of the converted AC output of the inverter device is increased or decreased within a range equal to or lower than the set frequency in accordance with an increase or decrease in the water level of the water source.

4. The operation control method for the engine-driven electric generator according to claim 1,
   wherein after the converted AC output of the inverter device is stopped, the engine is stopped on a condition that the water level of the water source is not equal to or higher than the upper limit water level, and
   when the water level of the water source is equal to or higher than the upper limit water level,
   operation of the engine is continued, and the inverter device increases the frequency of the converted AC output again to the set frequency to drive the submersible pump at a speed capable of suppressing an increase in the starting current of the submersible pump.

5. An engine-driven electric generator comprising;
an engine;
an electric generator driven by the engine;
an inverter device that converts an alternating current (AC) input from the electric generator into a converted AC output having a predetermined frequency, the inverter device outputting the converted AC to a submersible pump;
a three-phase output terminal block connected to the inverter device, the three-phase output terminal block also connected to the submersible pump, the submersible pump placed in a water source;
a detector connection port for connecting a detector, the detector being a float type water level sensor or an electrode type water level sensor for detecting a water level of the water source, the detector connection port receiving a detection signal input from the detector; and
a controller that controls operation of both the engine and the inverter device based on the detection signal input from the detector via the detector connection port,
wherein the engine-driven electric generator has a standby state in which both the engine and an output of the inverter device are stopped;
when the controller determines, based on the detection signal from the detector, that the water level of the water source is equal to or higher than a predetermined upper limit water level and the engine-driven electric generator is in the standby state,
the controller starts the engine, then the controller operates the engine at a predetermined rated rotation speed; and then
the controller operates the inverter device to gradually increase a frequency of the converted AC output from zero frequency to a predetermined set frequency to suppress an increase in a starting current of the submersible pump; and
when the controller determines, based on the detection signal from the detector, that the water level of the water source is lower than a predetermined lower limit water level and the engine is operating at the rated rotation speed,
the controller stops the converted AC output of the inverter device; and
the controller stops the engine after the converted AC output of the inverter device is stopped, thereby returning the engine-driven electric generator to the standby state.

6. The engine-driven electric generator according to claim 5,
further comprising a dial switch that allows changing setting of the set frequency.

7. The engine-driven electric generator according to claim 6,
wherein the controller increases the frequency of the converted AC output of the inverter device to the set frequency and then maintains the frequency of the converted AC output of the inverter device at the set frequency until the water level of the water source becomes lower than the lower limit water level.

8. The engine-driven electric generator according to claim 6,
wherein when the controller increases the frequency of the converted AC output of the inverter device up to the set frequency, and the water level of the water source is lower than the upper limit water level and equal to or higher than the lower limit water level,
then the frequency of the converted AC output by the inverter device is increased or decreased within a range equal to or lower than the set frequency in accordance with an increase or decrease in the water level of the water source.

9. The engine-driven electric generator according to claim 6,
wherein the controller stops the engine after stopping the converted AC output of the inverter device and on a condition that the water level of the water source is not equal to or higher than the upper limit water level, and when the water level of the water source is equal to or higher than the upper limit water level,
the controller continues to operate the engine and the inverter device increases the frequency of the converted AC output again to the set frequency to drive the submersible pump at a speed capable of suppressing an increase in the starting current of the submersible pump.

10. The engine-driven electric generator according to claim 5,
wherein the controller increases the frequency of the converted AC output of the inverter device to the set frequency and then maintains the frequency of the converted AC output of the inverter device at the set frequency until the water level of the water source becomes lower than the lower limit water level.

11. The engine-driven electric generator according to claim 5,
wherein when the controller increases the frequency of the converted AC output of the inverter device up to the set frequency, and the water level of the water source is lower than the upper limit water level and equal to or higher than the lower limit water level,
then the frequency of the converted AC output of the inverter device is increased or decreased within a range equal to or lower than the set frequency in accordance with an increase or decrease in the water level of the water source.

12. The engine-driven electric generator according to claim 5,
wherein the controller stops the engine after stopping the converted AC output of the inverter device and on a condition that the water level of the water source is not equal to or higher than the upper limit water level, and when the water level of the water source is equal to or higher than the upper limit water level,
the controller continues to operate the engine and the inverter device increases the frequency of the converted AC output again to the set frequency to drive the submersible pump at a speed capable of suppressing an increase in the starting current of the submersible pump.

* * * * *